United States Patent
Wong et al.

(10) Patent No.: US 9,501,801 B2
(45) Date of Patent: Nov. 22, 2016

(54) ONE CLICK TO UPDATE BUYER IN MASS ON PURCHASER ORDERS AND PREPARE CHANGES TO COMMUNICATE TO SUPPLIER

(71) Applicant: Oracle International Corporation, Redwood Shores, CA (US)

(72) Inventors: Elaine Diana Wong, San Ramon, CA (US); Thomas Keith Workman, Layton, UT (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 378 days.

(21) Appl. No.: 14/038,557

(22) Filed: Sep. 26, 2013

(65) Prior Publication Data
US 2014/0089150 A1    Mar. 27, 2014

Related U.S. Application Data

(60) Provisional application No. 61/706,521, filed on Sep. 27, 2012.

(51) Int. Cl.
| G07B 17/00 | (2006.01) |
| G07F 19/00 | (2006.01) |
| G06Q 40/00 | (2012.01) |
| G06Q 10/06 | (2012.01) |

(52) U.S. Cl.
CPC .............. *G06Q 40/10* (2013.01); *G06Q 10/06* (2013.01)

(58) Field of Classification Search
USPC .................................................. 705/30, 34
See application file for complete search history.

(56) References Cited

U.S. PATENT DOCUMENTS

| 4,827,423 A * | 5/1989 | Beasley ............. G01N 29/2493 700/100 |
| 6,539,386 B1 * | 3/2003 | Athavale .............. G06Q 10/087 |
| 7,266,573 B2 * | 9/2007 | Pecht-Seibert ... G06F 17/30575 |
| 8,078,626 B1 * | 12/2011 | Whitt ................. G06F 17/30551 707/751 |
| 2002/0073111 A1 * | 6/2002 | Heyliger ............. G06F 3/04845 715/247 |
| 2002/0133509 A1 * | 9/2002 | Johnston ............... G06F 17/243 |
| 2002/0147726 A1 * | 10/2002 | Yehia ...................... G06Q 10/10 |
| 2002/0165724 A1 * | 11/2002 | Blankesteijn .......... G06Q 30/06 705/1.1 |
| 2003/0050826 A1 * | 3/2003 | Cargille ................. G06Q 10/06 705/7.25 |
| 2004/0078430 A1 * | 4/2004 | Aubert ................... G06Q 10/06 709/204 |

(Continued)

*Primary Examiner* — Ashford S Hayles
(74) *Attorney, Agent, or Firm* — Kilpatrick Townsend & Stockton LLP

(57) ABSTRACT

A mass change of values of a specified attribute (e.g., buyer identity) of multiple purchase orders can be performed automatically in conjunction with additional automatically performed operations, and all in response to a single user activation of a button control, without requiring any further human intervention. The additional operations can include the creation of change orders for each changed purchase order; the logging of each change made to each purchase order in an audit history; the requesting of change approvals for purchase orders; and the preparation of the created change orders for communication to suppliers to whom the changed purchase orders pertain. Thus, each supplier can made aware via an automated process that he is now dealing with a different entity than before.

20 Claims, 14 Drawing Sheets

(56) References Cited

U.S. PATENT DOCUMENTS

| | | | |
|---|---|---|---|
| 2004/0139082 A1* | 7/2004 | Knauerhase | H04L 63/0227 |
| 2004/0254842 A1* | 12/2004 | Kirkegaard | G06Q 10/063 705/22 |
| 2005/0193029 A1* | 9/2005 | Rom | G06Q 30/00 |
| 2009/0037203 A1* | 2/2009 | Gallagher | G06Q 10/08 705/300 |
| 2009/0055761 A1* | 2/2009 | Basson | G06F 17/24 715/764 |
| 2010/0211482 A1* | 8/2010 | Nambiar | G06Q 10/087 705/30 |
| 2010/0332973 A1* | 12/2010 | Kloiber | G06F 17/30011 715/255 |
| 2011/0202437 A1* | 8/2011 | Nambiar | G06Q 30/04 705/30 |
| 2011/0320365 A1* | 12/2011 | Gopalakrishnan | G06Q 10/06312 705/301 |
| 2013/0219268 A1* | 8/2013 | Straten | G06F 17/243 715/256 |
| 2013/0246232 A1* | 9/2013 | Swanson | G06Q 30/0633 705/30 |

* cited by examiner

Define Role Actions and Categories

Transaction: Requisition eProcurement Role Action Categories                                   Find | View All First ◀ 1 of 5 ▶ Last

| Role Action Category | Requisition Header | Definition | The selections for this category will control the users access to specific fields and pages on the Requisition Header |

Role Actions                                                          Customize | Find | View All | 🖾 | 🏛 First ◀ 1 of 1 ▶ Last

| Role Action name | Description | Object Type | Action Controls | |
|---|---|---|---|---|
| Requisition Settings page | When enabled this will be the first page the requester will access. This control will take precedence over | Page | Enable | + |
| Requisition Settings Link | Controls whether the Requester has access to the Requisition Settings hyperlink | Hyperlink | Show | + |
| Default Option | Controls which defaulting page displays to the user. Override versus Default retrofit page or the system | Page | Enable | + |
| Change Requisition BU | Controls whether the requester can change the business unit and requester fields in add mode. | Fields | Editable | + |

[Add]   [Update Display]

[Save]  [Return to Search]  [Notify]

FIG. 3

Assign Actions to Role

Transaction: Requisition
Role Name Requester Level 2        Description  Requester Level 2
Copy to Role eProcurement Role Action Categories                              Find | View All  First  ◀ 1 of 5 ▶ Last

| Role Action Category | Requisition Header | Definition | The selections for this category will control the users access to specific fields and pages on the Requisition Header |

Role Actions                          Customize | Find | View All | 🔄 | 🎬  First ◀ 1 of 1 ▶ Last

| Role Action name | Description | Object Type | Action Controls |
|---|---|---|---|
| Requisition Settings page | When enabled this will be the first page the requester will access. This control will take precedence over | Page | Enable ▾ |
| Requisition Settings link | Controls whether the Requester has access to the Requisition Settings hyperlink | Hyperlink | Show ▾ |
| Default Option | Controls which defaulting page displays to the user. Override versus Default retrofit page or the system | Page | Enable ▾ |
| Change Requisition BU | Controls whether the requester can change the business unit and requester fields in add mode. | Fields | Editable ▾ |

[Add]

[Save]   [Return to Search]  [Notify]

FIG. 5

Assign Actions to Role
Transaction: Requisition
Role Name Requester Level 2     Description Requester Level 2
Copy to Role [    ] 🔍 eProcurement Role Action Categories                                                Find | View All First ◀ 1 of 5 ▶ Last

| Role Action Category | Requisition Header | Definition | The selections for this category will control the users access to specific fields and pages on the Requisition Header |

Customize | Find | View All | 📷 | ⊞    First ◀ 1 of 1 ▶ Last

Role Actions

| Role Action name | Description | Object Type | Action Controls |
|---|---|---|---|
| Requisition Settings page | When enabled this will be the first page the requester will access. This control will take precedence over | Page | Enable ▼ |
| Requisition Settings link | Controls whether the Requester has access to the Requisition Settings hyperlink | Hyperlink | Show ▼ |
| Default Option | Controls which defaulting page displays to the user. Override versus Default retrofit page or the system | Page | Enable ▼ |
| Change Requisition BU | Controls whether the requester can change the business unit and requester fields in add mode. | Fields | Editable ▼ |

| Role Action Category | Requisition Item Search | Definition | The role actions in this category control searching capabilities and the display of icons and links to specific information |

Customize | Find | View All | 📷 | ⊞    First ◀ 1 of 1 ▶ Last

Role Actions

| Role Action name | Description | Object Type | Action Controls |
|---|---|---|---|
| Price Adjustments | Controls the display of price adjustments on the item search page and on the schedule of the | Icon and hyperlink | Hide ▼ |
| Price and Availability check | Controls the display of a button which allows a user to do a real-time price and availability check | Button | Show ▼ |

FIG. 6

Buyer Mass Change

INSTRUCTIONS: 1-Select the buyer to be changed. 2-Select the new buyer. 3-Use the search criteria below to select on which orders this change will take place. 4-Review the summary and click the Process button.

Replace Buyer [        ] 🔍 with Buyer [        ] 🔍

Purchase Order Search Criteria

Business Unit [    ] 🔍

Vendor ID [        ] 🔍

As Of Date [        ] 📅

PO Status Values
☑ Approved  ☑ Open
☑ Pending Appr  ☑ Initial
☑ Dispatched

[ Search ]

▲ Affected Purchase Orders

☐ Select/Deselect All

FIG. 8

| Buyer Mass Change | | | | | | | |
|---|---|---|---|---|---|---|---|
| Replace Buyer | VP1 | | 🔍 | Kenneth Schumacher | | | |
| with Buyer | CROTH | | 🔍 | Calvin Roth | | | |

Purchase Order Search Criteria

| Business Unit | US001 | 🔍 | | | PO Status Values | | |
|---|---|---|---|---|---|---|---|
| Vendor ID | SCM0000001 | 🔍 | BIKE SHOP | | ☑ Approved | ☑ Open | |
| As Of Date | | 📅 | | | ☑ Pending Appr | ☑ Initial | |
| | | | | | ☑ Dispatched | | |

Search

▼ Affected Purchase Orders          Customize | Find | View All | 🔁 | *⊞ First ◀ 1-10 of 32 ▶ Last

| | Business Unit | PO ID | PO Date | Vendor ID | Vendor Name | Buyer | PO Status |
|---|---|---|---|---|---|---|---|
| ☑ | US001 | TEST | 06/01/2010 | SCM0000001 | BIKE-001 | Kenneth Schumacher | Approved |
| ☑ | US001 | A1TM | 06/03/2010 | SCM0000001 | BIKE-001 | Kenneth Schumacher | Approved |
| ☑ | US001 | 0000000242 | 05/20/2010 | SCM0000001 | BIKE-001 | Kenneth Schumacher | Approved |
| ☑ | US001 | 0000000238 | 05/07/2010 | SCM0000001 | BIKE-001 | Kenneth Schumacher | Approved |
| ☐ | US001 | 0000000237 | 05/07/2010 | SCM0000001 | BIKE-001 | Kenneth Schumacher | Approved |
| ☐ | US001 | 0000000236 | 05/07/2010 | SCM0000001 | BIKE-001 | Kenneth Schumacher | Approved |
| ☐ | US001 | 0000000235 | 04/29/2010 | SCM0000001 | BIKE-001 | Kenneth Schumacher | Approved |
| ☐ | US001 | 0000000234 | 04/29/2010 | SCM0000001 | BIKE-001 | Kenneth Schumacher | Approved |
| ☐ | US001 | 0000000233 | 04/23/2010 | SCM0000001 | BIKE-001 | Kenneth Schumacher | Approved |
| ☐ | US001 | 0000000232 | 04/23/2010 | SCM0000001 | BIKE-001 | Kenneth Schumacher | Approved |

☐ Select/Deselect All

Selection Summary

You have selected to change Buyer VP1 to Buyer CROTH on 4 Purchase Orders. To complete this change, click the button below.

Process Change

FIG. 9

ONE CLICK TO UPDATE BUYER IN MASS ON PURCHASER ORDERS AND PREPARE CHANGES TO COMMUNICATE TO SUPPLIER

CLAIM OF PRIORITY

The present application claims priority under 35 U.S.C. §119 to U.S. Provisional Patent Application Ser. No. 61/706,521; titled "ONE CLICK TO UPDATE BUYER IN MASS ON PURCHASER ORDERS AND PREPARE CHANGES TO COMMUNICATE TO SUPPLIER"; filed on Sep. 27, 2012; and the entire contents of which are incorporated by reference herein.

BACKGROUND

The discussion below relates generally to the field of enterprise resource planning (ERP) software. ERP software is business management software that allows an organization to use a system of integrated applications to manage business. ERP software can integrate all facets of an operation, including development, manufacturing, sales and marketing. ERP software can include many enterprise software modules that are individually purchased, based on what best meets the specific needs and technical capabilities of the organization. Each ERP module can be focused on one area of business processes, such as product development or marketing. Some of the more common ERP modules can include those for product planning, material purchasing, inventory control, distribution, accounting, marketing, finance and human resources (HR). As the ERP methodology has become more popular, software applications have emerged to help business managers implement ERP in other business activities. Applications may incorporate modules for customer relationship management (CRM) and business intelligence. These modules can be presented as a single unified package. A central repository can store all information that is shared by all the various ERP facets in order to smooth the flow of data across the organization.

Oracle's PeopleSoft supplier relationship management is an integrated suite of procurement applications that can reduce supply management costs. PeopleSoft supplier relationship management can reduce spending on goods and services, streamline procure-to-pay processes, and drive policy compliance. PeopleSoft supplier relationship management provides packaged integration of procurement functions with financial management, human capital management, and ERP suites. PeopleSoft supplier relationship management can give customers the flexibility to leverage applications on-demand, on-premises, or in any combination needed to achieve procurement objectives. PeopleSoft supplier relationship management can integrate procurement with HR in order to provide total workforce management of both contingent and full-time workers.

Organizations recognize the importance of strategic procurement practices as a key component of improved profitability. Request-for-quote and request-for-proposal (collectively RFx) activities can focus on finding the best value and lowest total cost supplier rather than just searching for the lowest price. Tools such as online auctions can be used to increase supplier competition and to benefit to organizations across a growing number of industries.

Strategic sourcing refers to the process of determining the best suppliers for needed goods or services, and the conditions under which business is to be awarded to those suppliers. The strategic element of sourcing can come from the ability to apply different methodologies to create the most value in an organization's supply chain. This value can come in the form of pricing, warranty terms, quality, delivery accuracy, or other factors. Strategic sourcing enables an organization to quantify and balance such requirements so that the organization can achieve its specific business objectives.

Using sourcing tools and strategies, organizations can make buying decisions as part of an overall strategy for achieving business goals, with a view toward building long-term relationships with key suppliers. In an era of ever-increasing demands for cost control and higher operational performance, procurement has become a mission-critical operation. A complete solution built on internet-based portal technologies, reverse auction capabilities, and proposal analysis tools can deliver significant value to an organization.

PeopleSoft Strategic Sourcing can enable an organization to efficiently onboard bidders with self-service registration, reduce procurement costs through competitive bidding and reverse auctions, align its purchasing objectives and execution with overall business strategy, automate and control the RFx and auction process both inside and outside the enterprise, leverage existing supplier and customer relationships while reaching out to new trading partners, track bidder participation and results effectively, retain its knowledge and strategies in an application for future use and performance analysis, perform award analysis using optimization to help determine optimal awards, plan sourcing activities using planning tools that help track progress, and estimate the total cost of transacting with suppliers beyond just price.

Supplier contract management has become even more overwhelming in the face of new business challenges such as globalization, outsourcing, and increased regulatory pressure. Today, most companies record some financial details about their contracts in their purchasing system, but many still store the actual contract document offline (for example, in a file cabinet) with no connection to the execution and compliance activity. Authoring remains a manual process lacking many if any controls. Terms negotiations can be cumbersome and time-consuming, and incomplete adoption and lackluster enforcement can prevent even the best-negotiated contracts from realizing expected savings.

BRIEF DESCRIPTION OF THE DRAWINGS

FIG. 3 is a diagram that illustrates an example of a portion of a user interface through which an application administrator can define, for a particular transaction type, custom categories of application aspects, the aspects included within those categories, the aspect types of those aspects, and the potential interactions that can be had with those aspects, according to an embodiment of the invention;

FIG. 5 is a diagram that illustrates an example of a portion of a user interface through which an application administrator can define, for a particular custom role, the actual interactions that users to whom that particular custom role is assigned can be have with various application aspects that are defined for a transaction type for which the particular custom role is being defined, according to an embodiment of the invention;

FIG. 6 is a diagram that illustrates an example of an alternative view of the role definition user interface of FIG. 5, in which multiple application aspect categories are shown, according to an embodiment of the invention;

FIG. 8 is a diagram that illustrates an example of a portion of a user interface through which the parameters of a mass change can be specified prior to the commencement of the performance of the mass change, according to an embodiment of the invention;

FIG. 9 is a diagram that illustrates an example of a portion of a user interface that lists identities of and certain attributes of purchase orders that satisfy the user-specified search criteria received via the user interface of FIG. 8, according to an embodiment of the invention;

DETAILED DESCRIPTION

Figure 1A:
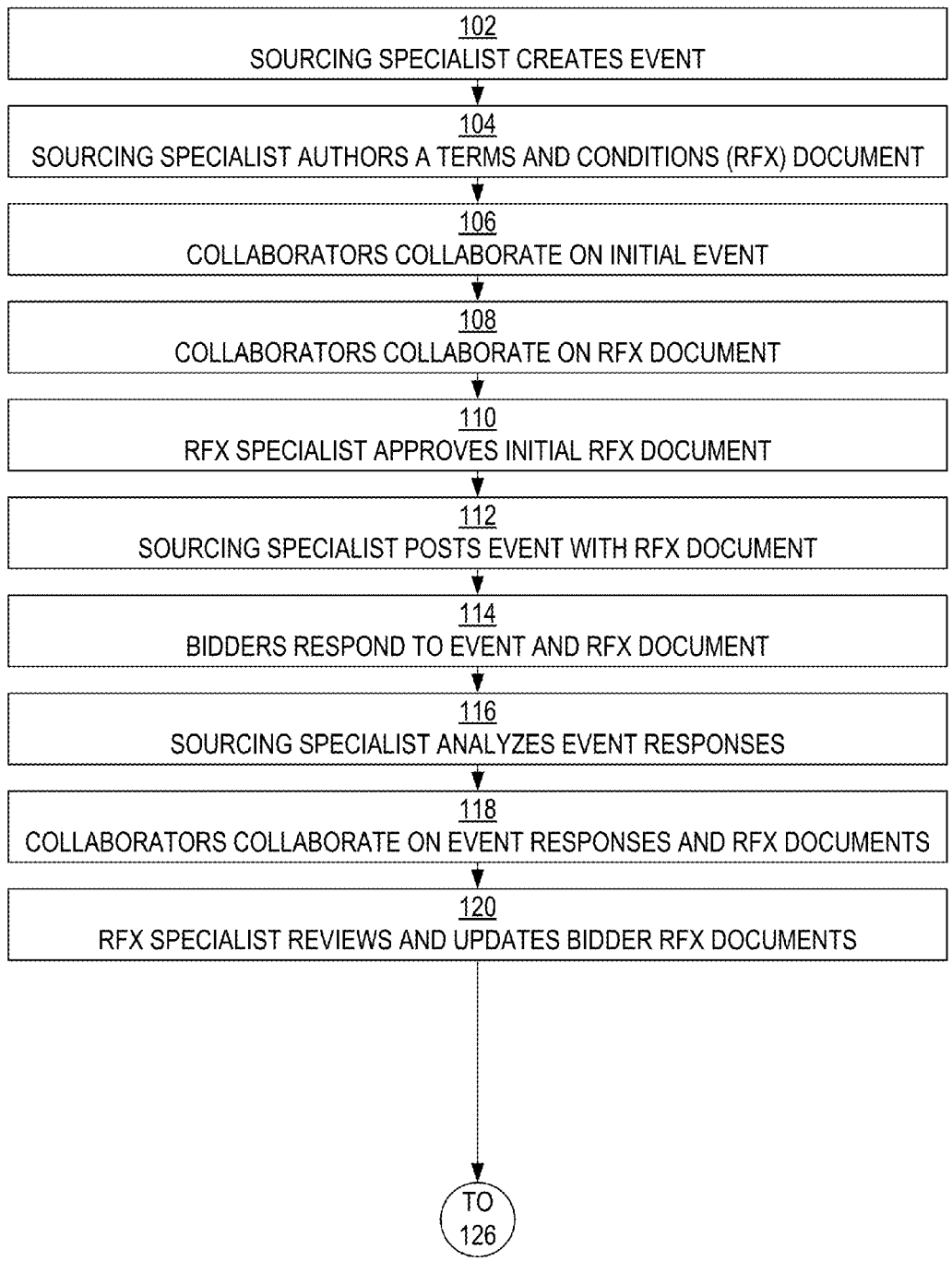
FIGS. 1A-C are flow diagrams that illustrate a technique for processing content in a collaborative manner, according to an embodiment of the invention.

In the following description, for the purposes of explanation, specific details are set forth in order to provide a thorough understanding of embodiments of the invention. However, it will be apparent that the invention may be practiced without these specific details.

Overview

According to one embodiment of the invention, an authored contract document can be created in an automated manner based at least in part on an existing RFx sourcing document such as a "terms and conditions" document. This RFx sourcing document can be the product of collaboration and editing by various separate parties, such as unrelated bidders. The processing involved in creating the contract document can use a rules-based multi-source configurator. This multi-source configurator can provide the capability to include in the contract document, or exclude from the contract document, clauses and/or edits that have been made to the RFx document based upon which the contract document is to be generated automatically. The multi-source configurator can additionally or alternatively provide the capability to replace (a) certain text from the RFx document that is not typically found in or relevant to a contract document with (b) contract-specific text that is not typically found in or relevant to an RFx document. The multi-source configurator can additionally or alternatively add, to the contract document, contract-specific text that is not contained within the RFx document. Automatically generating the contract document from the RFx document can reduce the opportunities for errors or inconsistencies to be introduced into the contract document during contact creation.

According to one embodiment of the invention, a role action framework allows for comprehensive control of various objects, data, and behaviors within a procurement and requisitioning application. In an embodiment, this framework can be extended to be used by various transactions. Embodiments of the invention can provide a common and central mechanism that makes a supplier relationship management application highly configurable. This mechanism can allow organizations to customize the application in a manner that is most suitable for the different types of those organizations' users. For example, using this mechanism, users having defined roles within the organization can be limited to appropriate interactions with various facets of the application, such as objects, data, and behaviors. Using the mechanism, an organization can define customized roles, and for each role, the organization can define, for each facet of the application, interactions that users assigned to that role can have relative to that facet. Consequently, organizations are not forced to modify software application code in order to configure the supplier relationship management application software in a manner that meets the needs of their organizations' user types.

According to one embodiment of the invention, a technique can automatically perform the mass change of a value of a specified attribute (e.g., a buyer identity) within multiple purchase orders from a specified old value to a specified new value. Additionally, the technique can automatically perform other operations in conjunction with the mass change of the specified attribute. These other operations can include, for example, the creation of change orders for each changed purchase order; the logging of each change made to each purchase order in a persistently stored audit history; the requesting of change approvals for purchase orders requiring such approval; and the preparation of the created change orders for communication to, and potentially the actual communication to, various suppliers to whom the changed purchase orders pertain. Each change order can indicate, to the supplier, that the specified attribute value (e.g., buyer identity) has changed from the old value to the new value, so that the supplier can made aware, for example, that he is now dealing with a different entity than before. Significantly, in an embodiment of the invention, both the mass attribute value change and the other operations performed in conjunction with the mass attribute change all can be performed in response to a user's single activation of a specified button control without further human intervention.

Template-Enhanced Bidding

Discussion shall begin with an embodiment of the invention involving automatic contract generation based on a collaboratively produced RFx document. In one embodiment, a multi-source configurator can be a template that contains rules. These rules can enable text, such as terms and conditions, to be pulled from a contract library. These rules can assemble text into a Microsoft Word document contract file. This assembly can involve the assembly of text marked up with XML tags. Each item of information within the document can be associated with a unique identifier. These identifiers can be carried within the document perpetually. Contract authoring can be automated based on strategic sourcing events, such as event that occur during a quoting process. During a transactional event, multiple bidders can be requested. The bidders can review an RFx document and respond with various bids. The bids can be evaluated as part of strategic sourcing. Based on this evaluation, the pool of bidders can be narrowed down. Eventually, one or more bids can be accepted. A contract or purchase order can be awarded to the bidders whose bids were accepted. According to an embodiment of the invention, authoring capabilities can be added to the bidding process.

Collaborative Content Processing

Figure 1B:
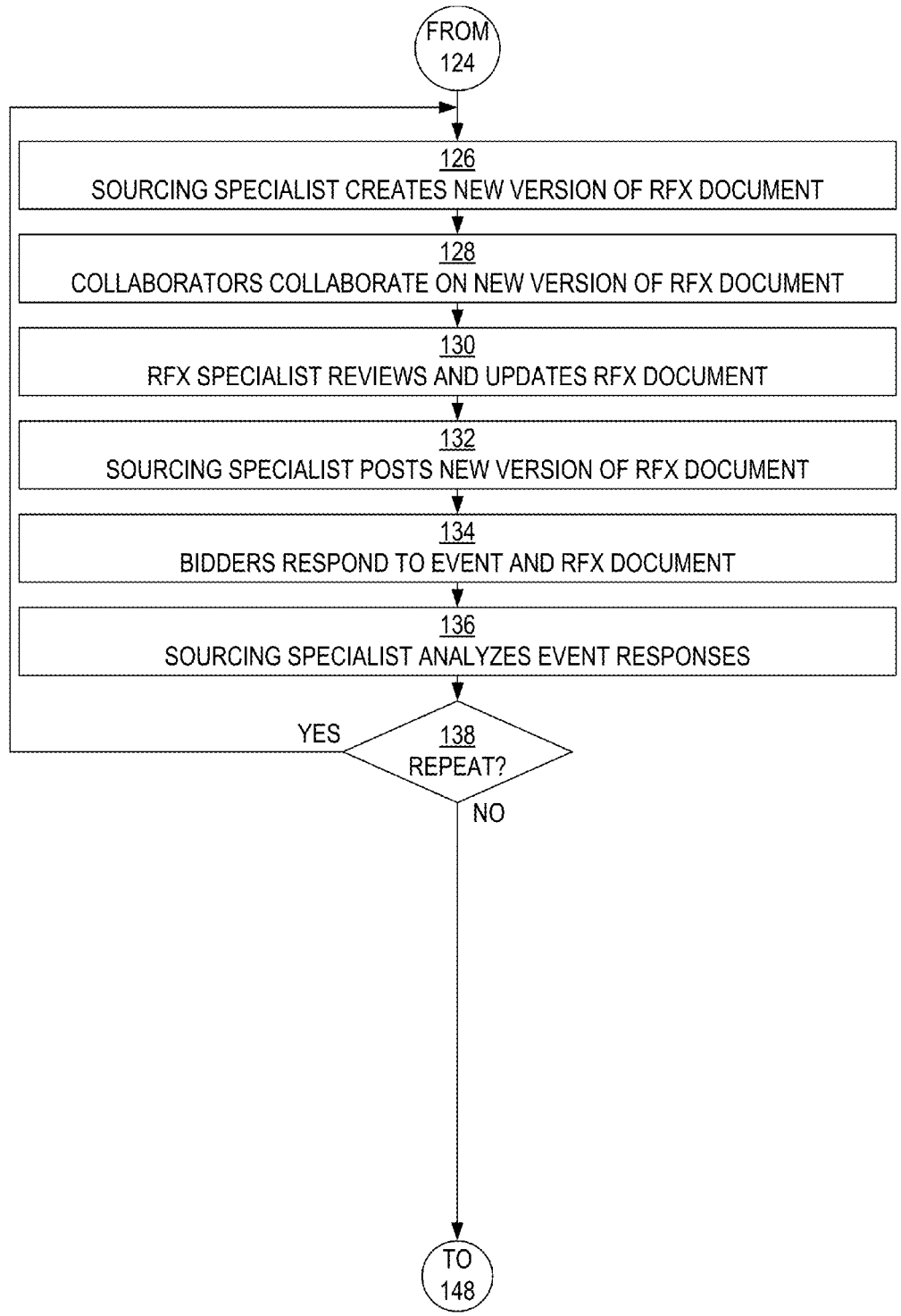
Figure 1C:
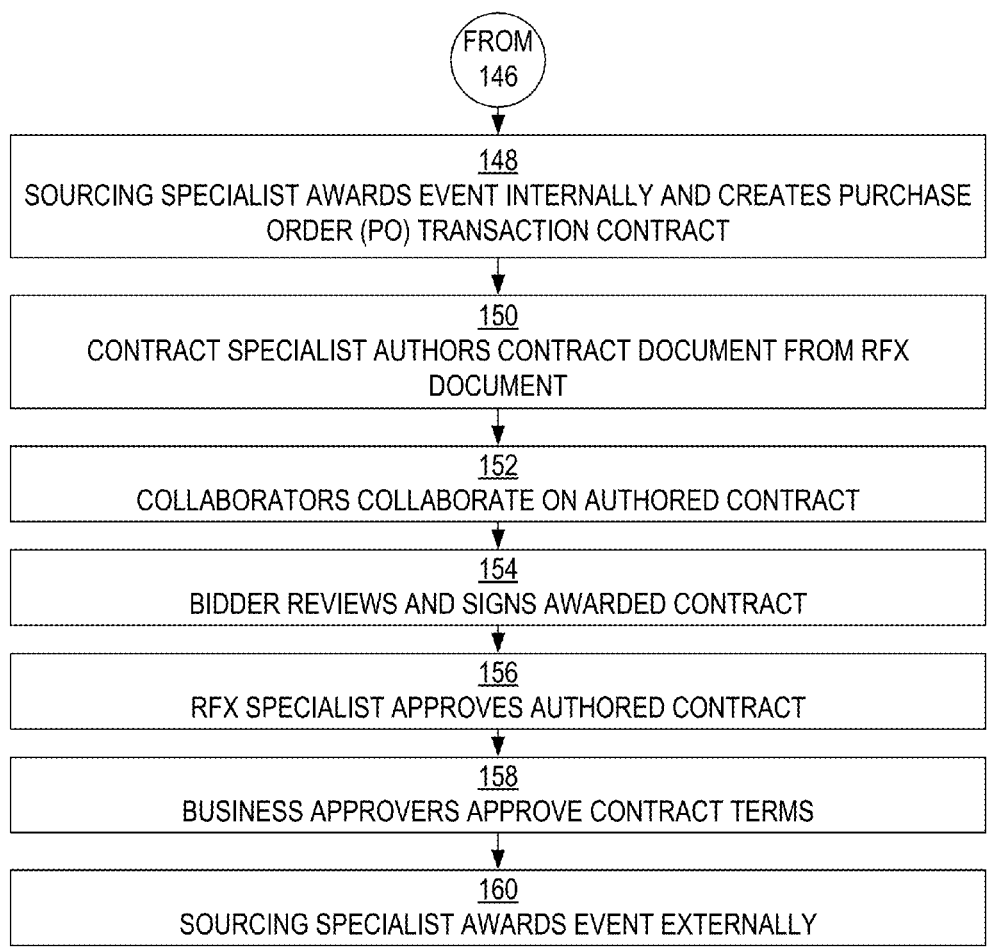

A "terms and conditions" document, which is one kind of RFx document, is created during a sourcing process. Such a document can contain content that is highly similar to at least some of the content that eventually will be included within an awarded procurement contract once the sourcing process has been completed. During the sourcing process, many alterations can be made to bids. Some text from the RFx document might not need to be carried forward into the authored contract document, while other text ought to be carried forward into the authored contract document. According to an embodiment of the invention, a multi-source rules-based configurator can be used in order to create the authored contract document automatically based upon the RFx (e.g., "terms and conditions") document created during the sourcing process. The multi-source configurator can be a single template that is associated with rule-specifying metadata. This configurator can be shared across multiple sources, such as the RFx document and the authored contract document. In an embodiment, the rules associated with (and in one embodiment contained within) the configurator can control the creation and updating of XML-based terms and conditions within the final authored contract document. FIGS. 1A-C are flow diagrams that illustrate a technique for processing content in a collaborative manner, according to an embodiment of the invention. Various different parties can be involved in the performance of the technique, including, for example, a sourcing specialist, multiple collaborators, an RFx specialist, bidders, a contract specialist, business approvers, etc.

The technique begins with block 102 of FIG. 1A. In block 102, a sourcing specialist can create an event. An event can be the creation of or a modification to a document such as an RFx document, for example. In block 104, the sourcing specialist can authors "terms and conditions" document, which is one kind of RFx document. In block 106, multiple collaborators can collaborate on the initial event. In block 108, the multiple collaborators can collaborate on the RFx document. In block 110, an RFx specialist can approve the initial RFx document. In block 112, the sourcing specialist can post an event within the RFx document. Thus, in an embodiment of the invention, during event creation, the RFx document can be authored and collaborated upon by multiple collaborators. Authoring can be integrated throughout the process discussed in relation to FIGS. 1A-C, and prior to actual final authored contract document creation.

Multiple iterations of a cycle can occur as a part of strategic sourcing. In this cycle, a transactional event can be posted to a portal for bidders to review. An authored RFx document can be involved in such a posting and review. In block 114, bidders can respond to the event and the RFx document. The bidders can collaborate upon the RFx document. The bidders can revise the RFx document. In an embodiment, multiple different versions of the RFx document (e.g., a separate version for each bidder) can be created in the process.

In block 116, the sourcing specialist can analyze the event responses. In block 118, the collaborators can collaborate on the event responses and the RFx documents. In block 120, an RFx specialist can review and update bidder RFx documents. The technique proceeds to block 126 of FIG. 1B.

Referring now to FIG. 1B, in block 126, the sourcing specialist can optionally create a new version of the RFx document. In block 128, the multiple collaborators can collaborate on the new version of the RFx document. In block 130, the RFx specialist can review and update the RFx document.

In block 132, the sourcing specialist can post a new version of the RFx document. In block 134, bidders can respond to the event and the RFx document. In block 136, the sourcing specialist can analyze the event responses. In block 136, a determination is made as to whether the process should be repeated. If the determination is that the process should be repeated, then control passes back to block 126. Otherwise, control passes to block 148 of FIG. 1C.

Based on bids from the bidders and the edits that the bidders have made to the RFx document, a contract can be awarded to one or more of the bidders. The RFx document can be involved within the contract award process. Such a contract may be a purchase order, for example, which is essentially a unilateral contract. Referring now to FIG. 1C, in block 148, the sourcing specialist awards an event internally and creates an authored contract document which can be, for example, a purchase order (PO) transaction contract. In block 150, a contract specialist authors an authored contract document from the RFx document. In an embodiment, a separate authored contract document can be constructed automatically for each separate RFx document edited by a particular bidder that has received an award, thereby creating separate authored contract documents for separate awarded bidders. During previous transactions, certain terms and conditions might have been agreed upon during the sourcing process. The creation of the authored contract document can be at least partially automated based upon the "upstream" RFx document(s) that potentially contain red-line edits from the bidders. In an embodiment, the multi-source configurator can take certain contents from the RFx document(s) and place those contents within the authored contract document(s). The selection of the contents to be taken from the RFx document(s) can be based on the rules associated with the configurator. Depending on the rules, some red-lined portions of the RFx document(s) can be carried forward into the authored contract document(s), so that bidder edits remain apparent within the authored contract document(s). This automatic carrying-forward of such edits can be preferable to the manual re-creation of such edits within an authored contract document, since the latter approach can be prone to error. Also depending on the rules, certain sections (potentially delimited by XML tags) from the RFx document(s) can be added to, changed, or deleted from the authored contract document(s). This pulling of content from the RFx document(s) into the authored contract document(s) can involve the usage of bind variable information from the authored contract document(s). In block 152, the multiple collaborators collaborate on the authored contract document. In block 154, the bidder reviews and signs the awarded contract. In block 156, the RFx specialist approves the authored contract document. In block 158, business approvers approve the contract terms. In block 160, the sourcing specialist awards the contract externally.

Rules-Based Automatic Authored Contract Document Generation

In an embodiment, the RFx document can be a Microsoft Word document. Microsoft Word provides a feature called "content controls." Sections of the RFx document to which content controls are applicable can be designated visually by a blue box bounding those sections. Such content controls can be "wrapped around" various terms or sections of the RFx document. Metadata pertaining to each content control can be maintained. The metadata pertaining to a particular content control can specify, among other information, the source from which the text "wrapped" by the particular content control came.

An RFx document can contain red-lined text that reflects an edit that has been made from the original (or previous) version of the RFx document. A bidder or sourcing agent can make such edits as a part of the collaborative process discussed above.

The RFx document might contain some undesirable terms that may be red-line edits. These undesirable terms might be omitted from authored contract document intentionally. The RFx document might contain some quote-specific terms, such as a quote deadline. Such quote-specific terms might not be relevant to the final authored contract document. The RFx document also might contain some bidder-made red-line edits that ought to be propagated and preserved within the final authored contract document. The bidding process might cause any or all of such types of features to become present within the RFx document.

Various operations can be performed relative to the RFx document during the automated generation of an authored contract document based upon that RFx document. In an embodiment, automatic authored contract document creation can be performed in response to a user's activation of a single "create contract" button control element, with reference to the RFx document, in a graphical user interface. In response to such activation, a computer process may notify the user that an RFx document usable for the creation of the authored contract document exists, and may ask the user whether the user wants that RFx document to be used in the automatic creation of the authored contract document. If the user responds affirmatively, then the computer process can apply, to the RFx document, the rules that are associated with the multi-source configurator; the RFx document can be a document that was created using the configurator template. As part of the application of the rules, for example, an introductory section of the RFx document might be automatically replaced with alternative text that is more appropriate for an authored contract document. For another example, as part of the application of the rules, undesirable red-line edits may be removed from certain portions of the RFx document that are propagated to the authored contract document. For yet another example, as part of the application of the rules, desirable red-line edits may be preserved within certain portions of the RFx document that are propagated to the authored contract document.

Multi-Source Configurator Definition

As is discussed above, a multi-source configurator can be a template that is associated with rules that can be applied to an RFx document in order to generate an authored contract document automatically. In an embodiment, a computer process provides a user interface through which a user can define the multi-source configurator. The user interface can specify a list of sources to which the multi-source configurator is to be applicable. For each source in the list, the user interface can contain a checkbox that allows the user to select whether that source is applicable. Such sources may include, for example, ad-hoc sources, a purchasing contract, a purchase order, and/or a sourcing event. In an embodiment, the multi-source configurator is a template that is applicable to multiple separate but potentially related documents, such as an RFx document and an authored contract document to be generated based on that RFx document.

The configurator definition user interface can also provide a mechanism through which the configurator's rules can be defined. The user interface may present a list of the configurator's rules. As is discussed above, various different sections of a document (such as an RFx document) can be "wrapped" by content controls that are each associated with unique identifiers. Each particular rule in the list of rules can specify such an identifier to which that particular rule pertains. A rule can specify whether text contained in the section having that identifier is to be propagated to the authored contract document. A rule can specify whether red-line edits within text contained in the section having that identifier are to be preserved or omitted when that text is propagated to the authored contract document. Each of these rules can be customized by the user who interacts with the user interface to define the multi-source configurator. In an embodiment, each rule can be associated with a structured query language (SQL) query that can be executed against data in a database in order to determine whether that content is to be included within the authored contract document being automatically generated. A rule can involve an evaluation of a specified condition, such as whether the source of a particular section having the specified identifier is a specified type of source (e.g., an ad-hoc source); in an embodiment, the rule is only applied if the specified condition is satisfied.

In addition to rules, the configurator definition user interface can display a list of clauses that identify, by their unique identifiers, sections of the RFx document that are always to be propagated into the authored contract document. In an embodiment, the user who interacts with the user interface to define the multi-source configurator can define and add such clauses to the list of clauses. During authored contract document generation, all sections of the RFx document having unique identifiers that are associated with clauses in the multi-source configurator can be propagated to the authored contract document.

For each rule and clause shown in the configurator definition user interface, the user interface may present an associated outline position. Such outline positions can be the same for all documents that are based on the multi-source configurator. These outline positions can correspond to headers, sections, articles, etc., in the documents based upon the configurator, and can be hierarchically organized relative to each other.

In an embodiment, an RFx document that specifies items that indicate terms and conditions can be presented over a computer network to two or more bidders. From each of the bidders, edits to the items can be received over the network. For each bidder, edits from that bidder can be incorporated into a version of the RFx document specific to that bidder. User input that selects (as awards) certain ones of the bidder's RFx documents can be received by a computing device. A separate purchase order contract can be automatically generated by the computing device for each of the selected bidder's RFx documents. The purchase order contracts can contain items that were modified by the corresponding bidders in the corresponding RFx documents. In an embodiment, the generation of the purchase order contracts can involve applying, to RFx documents, rules from the multi-source configurator's specified set of rules. In an embodiment, each RFx document can contain multiple sections. Each of the bidder-specific RFx documents can also contain these sections. Bidder-produced edits can be dispersed among multiple separate sections. The multi-source configurator's rules can be applied to specific sections to which those rules are mapped. In an embodiment, the application of the rules can involve the application of a rule that preserves, in the authored contract document being generated, bidder-produced edits that are present within an RFx document section to which that rule is specifically mapped. In an embodiment, the application of the rules can involve the application of a rule that replaces all text from an RFx document section to which that rule is specifically mapped with alternative text in the authored contract document being generated. In an embodiment, the application of the rules can involve the application of a rule that adds, to the authored contract document being generated, sections of text that are not contained within the RFx document upon which the authored contract document is based. Each bidder's version of the RFx document can be an instance of that template. Each purchase order contract that is automatically generated based on an awarded bidder's version of the RFx document can also be an instance of that template.

Role-Based Application Interaction Customization

Discussion shall now turn to an embodiment of the invention involving a mechanism through which custom user roles for an application (e.g., a supplier relationship management application) can be defined through a user interface. Using such a mechanism, an administrator can define custom roles, and can define interactions that users assigned to those roles can have relative to various aspects of the application. Such aspects of the application can include, for example, objects, data, and behaviors. Defined interactions may include whether or not an aspect is displayed to a user assigned to the role, whether or not an aspect is enabled for a user assigned to the role, and/or whether or not an aspect can be edited by a user assigned to the role.

Aspects of an application can be categorized into various separate categories. A mechanism can enable an application administrator to define those categories. In one embodiment of the invention, the categories can be defined based on transaction types. These transaction types can be specified by the application administrator through a user interface. In an embodiment, such transaction types can include, for example, requisition, workflow, receiving, buyer center, and administration.

Per-Aspect Potential Interaction Definition

Figure 2:
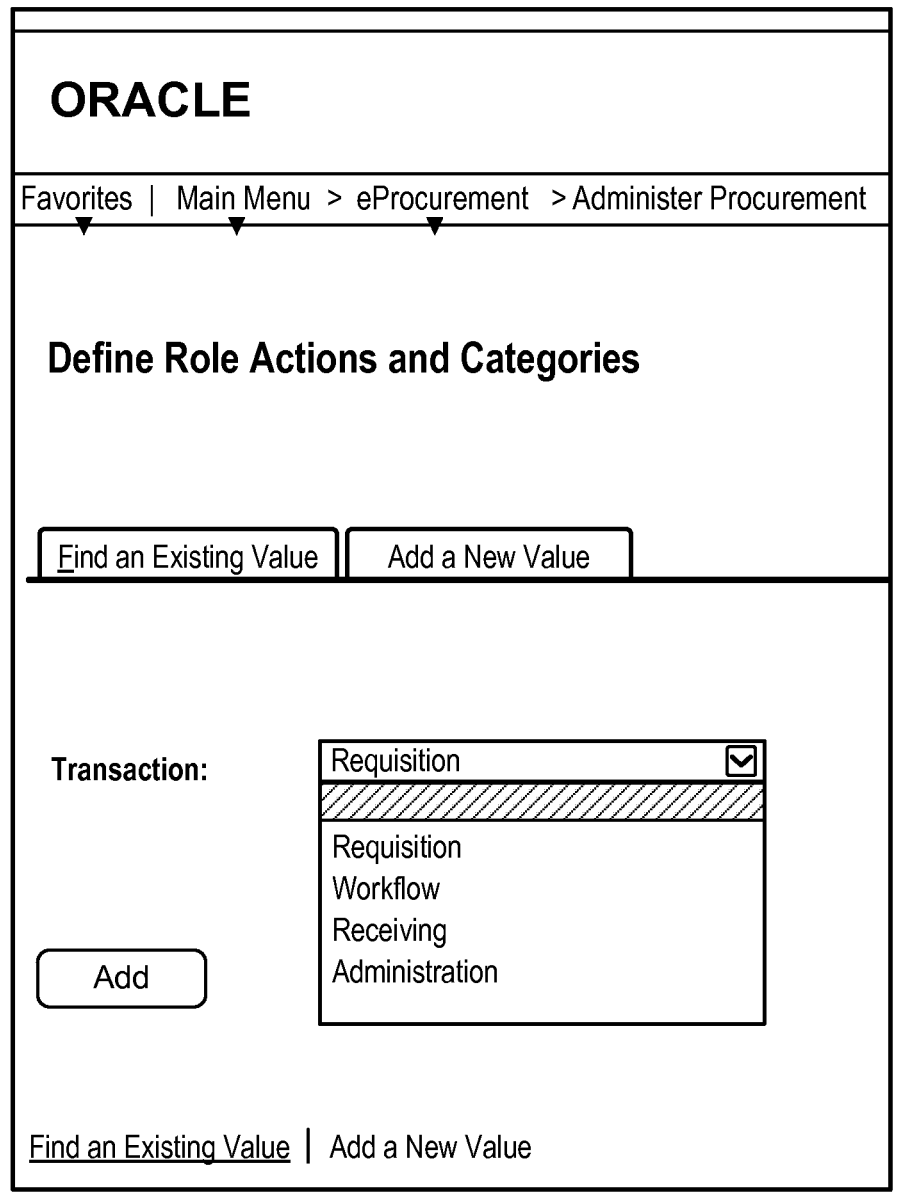
FIG. 2 is a diagram that illustrates an example of a portion of a user interface through which an application administrator can define transaction types and select transaction types for which different roles' interactions with application aspects are to be defined, according to an embodiment of the invention.

FIG. 2 is a diagram that illustrates an example of a portion of a user interface through which an application administrator can define transaction types and select transaction types for which different roles' interactions with application aspects are to be defined, according to an embodiment of the invention. As shown in FIG. 2, a drop-down box permits an application administrator to select, from among several different transaction types, the particular transaction type for which application aspects and the sets of possible interactions that can be conducted relative to each of those aspects are to be defined. In the example illustrated, the application administrator has selected the "requisition" transaction type. In one embodiment, a mechanism is provided whereby the application administrator can define new custom transaction types in addition to those already contained within the drop-down list.

FIG. 3 is a diagram that illustrates an example of a portion of a user interface through which an application administrator can define, for a particular transaction type, custom categories of application aspects, the aspects included within those categories, the aspect types of those aspects, and the potential interactions that can be had with those aspects, according to an embodiment of the invention. The application aspects are alternatively referred to herein as "role actions." As shown in FIG. 3, for the "requisition" transaction type, the administrator can define multiple different role action categories. In this specific example, the administrator has defined a role action category called "requisition header." The administrator can specify, for each role action, a name, a description, a type, and controls. In the example shown, the administrator has specified four different role actions to be included in the "requisition header" category of the "requisition" transaction type. For each role action, the application administrator can define that role action's type (e.g., page, hyperlink, fields, etc.—shown in the "object type" column). Each type can be associated with a different set of possible interactions (shown in the "action controls" column) that can be had with aspects that are of that type. These sets of interactions can be presented in separate drop-down boxes for each role action in the category. In one embodiment of the invention, a mechanism is provided whereby an administrator can define, for each aspect type, the set of potential interactions that can be had with aspects of that type.

Per-Role Actual Interaction Constraint

Figure 4:
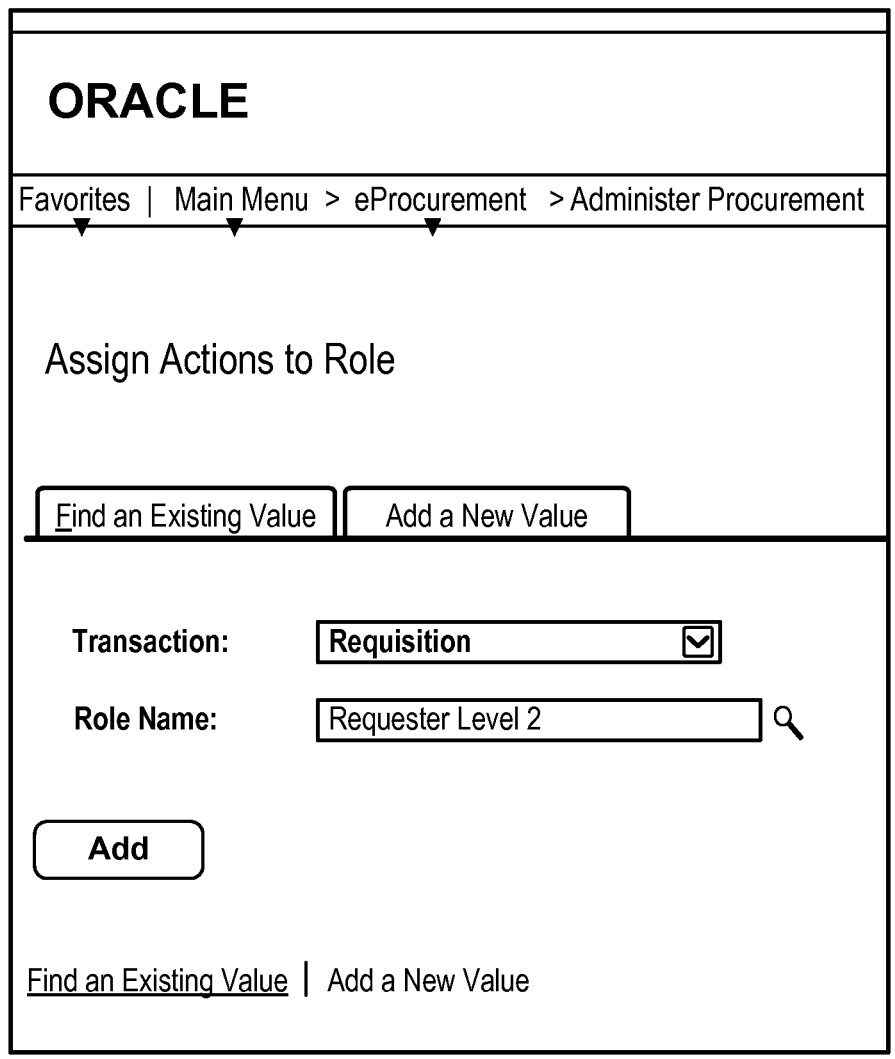
FIG. 4 is a diagram that illustrates an example of a portion of a user interface through which an application administrator can add a new custom role for a particular transaction type, according to an embodiment of the invention.

FIG. 4 is a diagram that illustrates an example of a portion of a user interface through which an application administrator can add a new custom role for a particular transaction type, according to an embodiment of the invention. As shown in FIG. 4, the application administrator has created, for the "requisition" transaction type, a new role that the application administrator has named "requester level 2." In an embodiment of the invention, a mechanism is provided whereby the application administrator can add and name any number of new roles specific to the selected transaction type. The transaction type can be selected through the user interface discussed above in connection with FIG. 2.

FIG. 5 is a diagram that illustrates an example of a portion of a user interface through which an application administrator can define, for a particular custom role, the actual interactions that users to whom that particular custom role is assigned can be have with various application aspects that are defined for a transaction type for which the particular custom role is being defined, according to an embodiment of the invention. As mentioned above, the application aspects are alternatively referred to herein as "role actions." In an embodiment, the categories and role actions that are displayed in the illustrated role definition user interface are the same as those that were previously defined using the user interface discussed above in connection with FIG. 3; the role action categories and the role actions shown in the illustrated role definition user interface are the ones that have been previously defined for the selected transaction type (e.g., "requisition," selected using the user interface discussed above in connection with FIG. 4). Had a different transaction type been selected, then the role action categories and role actions belonging to those categories as defined for that transaction type would have been presented instead.

As is discussed above in connection with FIG. 3, each role action can be associated with a corresponding and separate set of potential interactions (shown in the "action controls" column). Using the user interface illustrated in FIG. 5, the application administrator can select, from among the sets of potential interactions associated with each role action, the actual interaction that users assigned to the role being defined (in this example, "requester level 2") are permitted to have relative to that role action. For example, as shown in FIG. 5, the application administrator has selected an action control of "enable" for a "requisition settings page" role action, an action control of "show" for a "requisition settings link" role action, and an action control of "editable" for a "change requisition BU" role action. As a result, in one embodiment, all users subsequently assigned the "requester level 2" role can be limited to having the specified actual interactions associated with the specified role actions.

For different roles, different interactions can be selected for the same role action. For example, while users assigned to one role might be prevented from viewing a certain page of an application, users assigned to another role might be allowed to view that same page of the application. For another example, while users assigned to one role might be shown a particular hyperlink on a page, users assigned to another role might not be shown that particular hyperlink on that page. For yet another example, while users assigned to one role might be allowed to edit the data contained in a particular field on a page, users assigned to another role might not be allowed to edit that data. Thus, in an embodiment of the invention, a mechanism is provided whereby an application administrator can define roles, and whereby the application administrator can limit or restrict user interactions (action controls) relative to various application aspects (role actions) on a role-by-role basis. The application administrator can subsequently assign the various different ones of the custom defined roles to various users within the administrator's organization.

According to one embodiment of the invention, multiple different roles can be assigned to a particular user. Under such circumstances, it is possible that the interactions associated with one of those roles might conflict with the interactions that are associated with one or more others of those roles. In an embodiment of the invention, when such a conflict occurs, then, for each application aspect (role action) for which a conflict exists, the least limiting interaction for that application aspect from all roles assigned to the user is selected to take precedence over all other interactions for that application aspect from those roles. For example, an "enable" interaction may take precedence over a "disable" interaction for the same application aspect; a "show" interaction may take precedence over a "hide" interaction for the same application aspect; and an "editable" interaction may take precedence over a "not editable" interaction for the same application aspect. Interactions for roles that are not assigned to the particular user do not need to be considered in resolving the conflict. In one embodiment of the invention, after multiple roles have been assigned to the particular user, a computer process presents, to the application administrator, a set of conflicts that exist (if any) for that particular user for that multiple role assignment, so that the application administrator can manually resolve such conflicts in advance (e.g., by changing the role-to-user assignments or the custom role definitions) if he so chooses.

FIG. 6 is a diagram that illustrates an example of an alternative view of the role definition user interface of FIG. 5, in which multiple application aspect categories are shown, according to an embodiment of the invention. As was discussed above in connection with FIG. 3, in one embodiment of the invention, a mechanism is provided whereby an application administrator can define custom categories of application aspects (i.e., role action categories) for a specific transaction type, and can include selected application aspects (i.e., role actions) within each such custom category. As is shown in the example illustrated in FIG. 6, two separate role action categories have been previously defined for the "requisition" transaction type: a "requisition header" role action category and a "requisition item search" role action category. Separation of role actions into categories can ease the application administrator's definition of the interactions that each custom role is allowed to have relative to the role actions within those categories. As in the role definition user interface discussed above in connection with FIG. 5, an application administrator can use the multi-category role definition user interface illustrated in FIG. 6 to set, for a specific custom role (in this example, "requester level 2") actual interactions that users assigned to that role are permitted to have relative to various application aspects (role actions).

Role Creation, Assignment, and Enforcement

Figure 7:
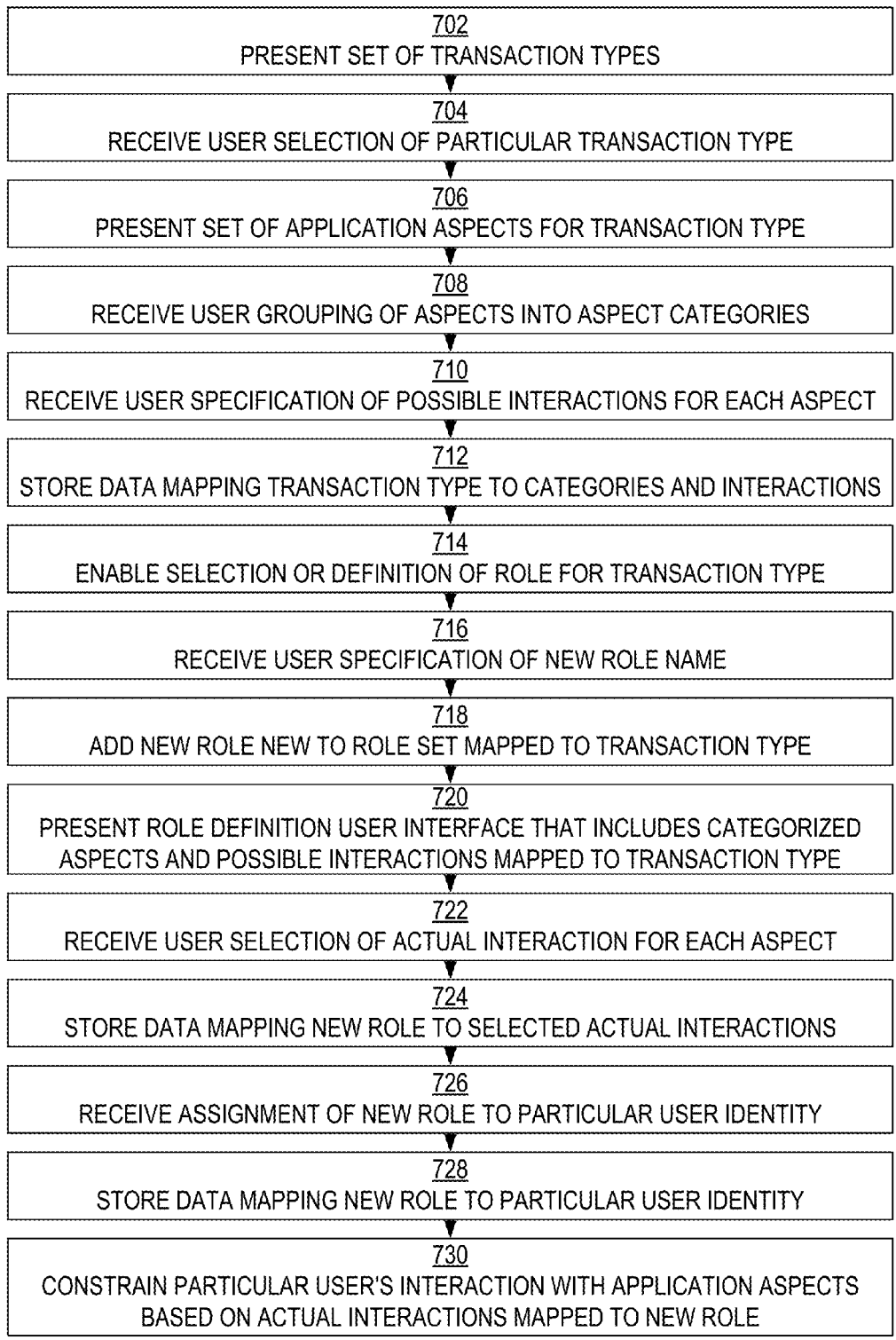
FIG. 7 is a flow diagram that illustrates an example of a technique for defining categories of application aspects and the sets of interactions possible for those aspects, defining roles that limit the actual interactions with those aspects, assigning those roles to users, and limiting the interactions that those users have relative to those aspects based on the definitions of the roles assigned to those users, according to an embodiment of the invention.

FIG. 7 is a flow diagram that illustrates an example of a technique for defining categories of application aspects and the sets of interactions possible for those aspects, defining roles that limit the actual interactions with those aspects, assigning those roles to users, and limiting the interactions that those users have relative to those aspects based on the definitions of the roles assigned to those users, according to an embodiment of the invention. In block 702, a transaction type selection user interface can present a set of transaction types. In block 704, user input indicating user selection of a particular transaction type can be received. In block 706, a possible interactions user interface can present, for the particular transaction type, a set of application aspects (role actions). In block 708, user input that groups the application aspects into aspect categories (role action categories) can be received. In block 710, user input that specifies, for each application aspect, a set of possible interactions (action controls) that can be had relative to that application aspect can be received. In an embodiment, each set of possible interactions may include one or more options such as: show, hide, enable, disable, editable, and/or not editable. The set of possible interactions can be indirectly determined based on user input that specifies, for each application aspect, the aspect type (object type) of that aspect. The set of possible interactions associated with one application aspect (role action) may differ from the set of possible interactions associated with another application aspect, due to those application aspects potentially being of different types. In block 712, data that maps the particular transaction type to the aspect categories and the sets of possible interactions for each application aspect in each category, as determined from the user input, can be stored.

In block 714, an initial role definition interface can present user interface elements usable to either (a) select a particular role from a set of roles that are mapped to the particular transaction type or (b) name a new role to be associated with the particular transaction type. In block 716, user input that names a new role can be received. In block 718, the new role's name can be added to the set of roles that are mapped to the particular transaction type. In block 720, a role definition user interface can present the categorized application aspects (role actions) and the sets of possible interactions (action controls) that the data stored in block 712 maps to the particular transaction type. In block 722, for each application aspect (role action) presented in the role definition user interface, user input selecting a particular actual interaction (action control) from that application aspect's associated set of possible interactions can be received. In block 724, data that maps the new role to each selected actual interaction for each application aspect can be stored.

In block 726, user input that assigns a particular user to the new role defined in blocks 716-724 can be received through a role assignment user interface. Different roles can be assigned to separate users, and multiple roles can be assigned to the same user. In block 728, data that maps the particular user's identity to the new role can be stored. In block 730, based at least in part on the actual interactions that are mapped to the new role, and the data that maps the particular user's identity to the new role, the particular user's interaction with various application aspects (role actions) can be constrained. For example, if the actual interaction selected for a page aspect is "disable" in the mapping to the user's role, then the user can be directed to an alternative page instead. For another example, if the actual interaction selected for a hyperlink aspect is "hide" in the mapping to the user's role, then the hyperlink can be obscured from the user on a page on which the hyperlink occurs. For yet another example, if the actual interaction selected for a field aspect is "not editable" in the mapping to the user's role, then the text in that field can be shown in an immutable form on a page on which the field occurs.

One-Click Mass Purchase Order Change and Supplier Notification

Discussion shall now turn to an embodiment of the invention involving a technique for performing mass change operations relative to multiple purchase orders in response to a single user click of a button control in a user interface, without requiring any further human intervention. In an embodiment of the invention, the mass change operations involve changing the value of each purchase order's buyer identity attribute from a specified old value to a specified new value; creating change orders for each changed purchase order; logging each change made to each purchase order in a persistently stored audit history; requesting change approvals for purchase orders requiring such approval; and preparing the created change orders for communication to various suppliers to whom the changed purchase orders pertain. The mass change operations also can involve actually communicating the created change orders to such suppliers. Each change order can indicate, to its respective supplier, that the buyer identity in his purchase order has changed from the old value to the new value, so that the supplier can made aware that he is now dealing with a different entity than before.

FIG. 8 is a diagram that illustrates an example of a portion of a user interface through which the parameters of a mass change can be specified prior to the commencement of the performance of the mass change, according to an embodiment of the invention. As shown in FIG. 8, the user interface can include a "replace buyer" and "with buyer" field. User input specifying the identity of the old buyer can be received in the "replace buyer" field. User input specifying the identity of the new buyer can be received in the "with buyer" field. Thus, in an embodiment, only purchase orders having the identity of the old buyer in their buyer identity fields will be targeted for the mass change (and, potentially, only a specified subset of those, as will be discussed further below). In an embodiment of the invention, after these values have been received through user input into the user interface, a computer process can responsively present a list of identities of purchase orders that will be affected by the mass change if the user elects to commence the performance of the mass change at that point in time. In one embodiment, the list of identities includes checkbox or other controls through which the user can select a specified subset of purchase orders to which the mass change will be applied; under such circumstances, non-selected purchase orders will be unaffected by the performance of the mass change.

According to an embodiment of the invention, the user interface can include further fields and user interface controls through which the purchase order selection criteria can be further constrained. As shown in FIG. 8, the example user interface includes a "business unit" field in which a business unit can be user-specified; a "vendor ID" field in which a vendor identity can be user-specified; an "as of date" field in which a date can be user-specified; and a set of checkboxes for multiple purchase order statuses. A given purchase order may possess multiple ones of these statuses concurrently. The purchase order statuses shown in the example of the user interface of FIG. 8 include an "approved" status, a "pending approval" status, a "dispatched" status, an "open" status, and an "initial" status. If the "business unit" field is populated, then only purchase orders having the identified business unit will be among those selected as targets for the performance of the mass change. Similarly, if the "vendor ID" field is populated, then only purchase orders having the identified vendor identity will be among those selected as targets for the performance of the mass change. If the "as of date" field is populated, then only purchase orders that have existed as of the user-specified date (i.e., on that date or earlier than that date) will be among those selected as targets for the performance of the mass change. For each of the checked checkboxes, only purchase orders having a status matching the status corresponding to that checkbox will be among those selected as targets for the performance of the mass change. As is discussed above, prior to the commencement of the performance of the mass change operation, a list of identities of all purchase orders satisfying the user-specified criteria can be presented to the user, and the user can elect to exclude selected ones of these purchase orders from the mass change operation. In an alternative embodiment, purchase orders having certain statuses are never selected, and are not presented to the user in the list of identities of purchase orders to be affected by the mass change operation. In such an embodiment, these statuses can include "closed," "cancelled," and/or "complete."

As is shown in FIG. 8, the example user interface includes a button control labeled "search." In an embodiment, user activation of the search button control causes the computer process to present, responsively, the list of identities of purchase orders to be affected by the mass change operation, as discussed above. This search results list can be displayed in the form of a grid having multiple rows and columns. Each row can pertain to a different purchase order, and each column can contain a different attribute value for that purchase order. For example, various columns can specify the purchase order's business unit, the purchase order's unique identifier, the purchase order's creation date, the purchase order's vendor identifier, the vendor name associated with that vendor identifier, the purchase order's current buyer identifier, and the purchase order's status. Each row also can include a hyperlink which, if user-selected, can cause the computer process to present a user interface that includes additional details about the purchase order with which that hyperlink is associated.

FIG. 9 is a diagram that illustrates an example of a portion of a user interface that lists identities of and certain attributes of purchase orders that satisfy the user-specified search criteria received via the user interface of FIG. 8, according to an embodiment of the invention. The list including the identities of the purchase orders to be affected by the performance of the mass change operation is shown in the table grid labeled "affected purchase orders." Each entry in the list is associated with a checkbox that can be user checked (which the checkbox may be by default) or unchecked in order to include or omit that particular entry from inclusion in the mass change operation. In an embodiment, controls in the user interface can be used to select or deselect the full list or individual entries in the list. In response to a change in the selection or deselection of any list entry, the selection summary presented in the user interface can change to indicate the current quantity of purchase orders that will be affected by the performance of the mass change operation.

The user's activation (e.g., via a single click) of the "process change" button control can begin the performance of the mass change operation relative to the selected purchase orders, as well as the additional operations to be automatically performed in conjunction with the mass change operation. In an embodiment, all such mass change and additional operations can be performed without any further human intervention after the activation of the "process change" button control.

In an alternative embodiment of the invention, in response to detecting that the user has activated the "process change" button, a computer process can present a message that indicates that the mass change operation is about to be performed. In such an alternative embodiment, the user can be given the choice to wait while the operation is performed, or to check a process monitor for verification of the operation's current status. In the event that the user elects to wait for the process to complete, a computer process can present a user interface through which the user can search a change order history. The user can review and verify the purchase order changes performed by the mass operation. If errors occur during the performance of the mass change operation, then a computer process can present a user interface that allows the user to approve or deny change requests. However, in one embodiment of the invention, the single activation of the "process change" will commence the mass change and associated operations (discussed below) without any further human interaction until the mass change and associated operations have been completed.

According to an embodiment of the invention, user activation of the "process change" button causes a computer process to begin performing the mass change operation relative to the selected purchase orders and also to begin performing the additional supportive operations automatically in association with the performance of the mass change operation. In one embodiment, these additional operations can be performed concurrently with the mass change operation; for example, each additional operation for a particular purchase order can be performed immediately after the attribute value for the particular purchase order has been changed, before the attribute value of subsequent purchase orders are changed. In an alternative embodiment, the additional operations for all of the selected purchase orders can be performed after all of the attribute values for all of the selected purchase orders have been changed.

The additional operations referred to above can include one or more of, but not necessarily all of, the following: creating change orders for each changed purchase order; logging each change made to each purchase order in a persistently stored audit history; requesting change approvals for purchase orders requiring such approval; and preparing the created change orders for communication to various suppliers to whom the changed purchase orders pertain. The additional operations also can involve actually communicating the created change orders to such suppliers.

In an embodiment, each change order can be a message that specifies at least the old and new attribute values for the changed purchase order to which that change order corresponds. Each change order can identify the name and contact information (e.g., street address, telephone number, e-mail address, etc.) for the vendor or supplier specified in the corresponding purchase order, so that the change order can be provided to that vendor or supplier. In an embodiment, the change orders can be automatically printed for subsequent mailing; mailing labels or envelopes can be addressed and printed automatically. In an embodiment, e-mail messages or short messaging system (SMS) text messages containing the substance of the change order can be automatically prepared and transmitted to vendor or supplier e-mail addresses or telephone numbers specified in the corresponding changed purchase order. According to an alternative embodiment, the automatic preparation and/or transmission of the change orders is performed relative only to changed purchase orders not having an "initial" status; in such an alternative embodiment, although affected purchase orders having the "initial" status do have the specified attribute values changed from the specified old value to the specified new value, change orders are not created for such affected purchase orders.

In one embodiment of the invention, each purchase order can be associated with a field that indicates whether or not that purchase order requires tracking. In such an embodiment of the invention, the following operations can be automatically performed for (and only for) purchase orders requiring such tracking: changes made to the purchase order can be inserted into a change tracking table in a database; a change order process can be executed against the change tracking table; a change order history and audit records can be inserted into history tables in the database; and the revised purchase order can be prepared for dispatching to the vendor or supplier specified in the purchase order. Additionally, in one embodiment of the invention, certain purchase orders may specify that approval from a specified party is required prior to the performance of the change. Under such circumstances, in one embodiment of the invention, an approval request to approve the change can be automatically transmitted (e.g., via e-mail) to each party whose approval is required as specified in the purchase order.

Although embodiments of the invention discussed above involve the mass change of a buyer identity attribute value within multiple purchase order records, alternative embodiments of the invention can be similarly applied to records that reflect information that is not purchase orders. Furthermore, alternative embodiments of the invention can be similarly applied to change specified attribute values other than buyer identities. In some such alternative embodiments of the invention, a user interface provides fields through which a user can specify one or more records attributes whose values are to be changed from user-specified old values to user-specified new values.

Figure 10:
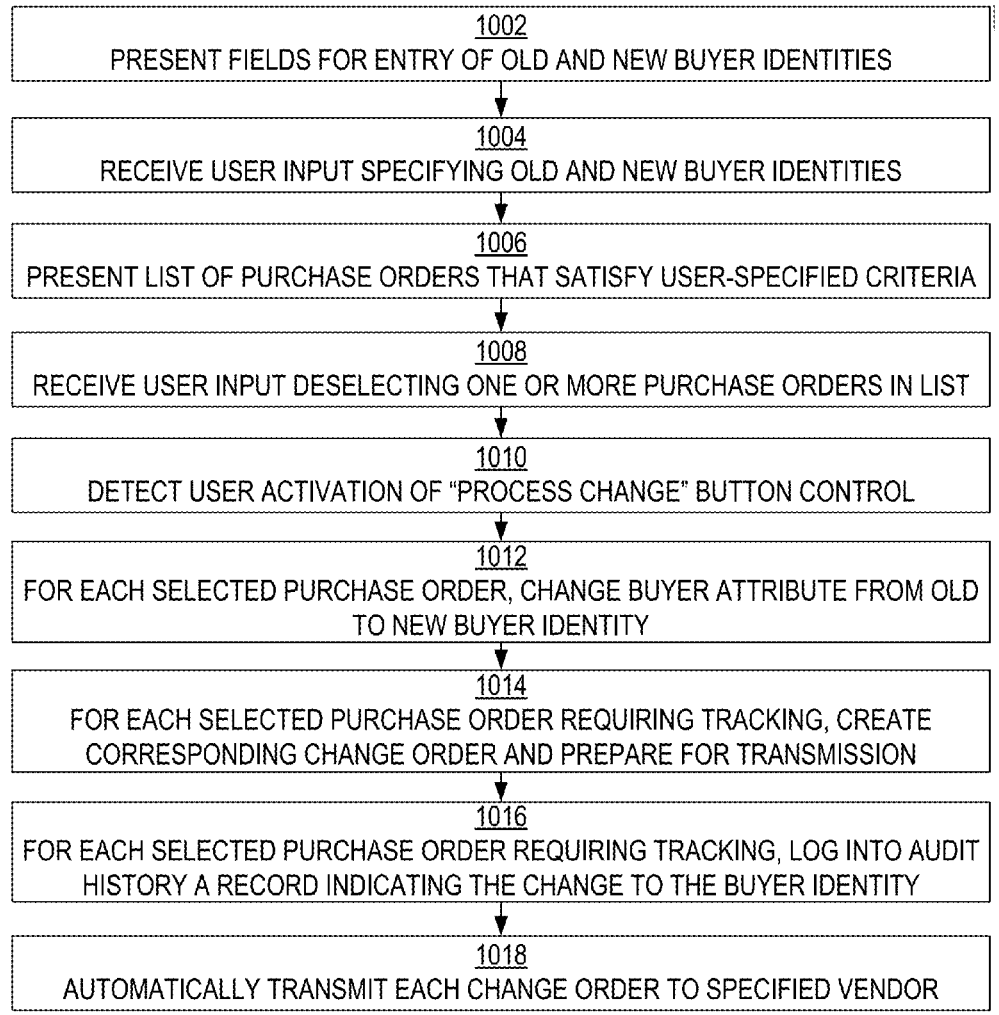
FIG. 10 is a flow diagram that illustrates an example of a technique for automatically performing a mass change of a buyer attribute relative to multiple purchase orders along with the automatic performance of the preparation of change records for transmission to suppliers identified in those purchase orders, all in response to user activation of a single button control, according to an embodiment of the invention.

FIG. 10 is a flow diagram that illustrates an example of a technique for automatically performing a mass change of a buyer attribute relative to multiple purchase orders along with the automatic performance of the preparation of change records for transmission to suppliers identified in those purchase orders, all in response to user activation of a single button control, according to an embodiment of the invention. In block 1002, a user interface that includes fields for specifying an old buyer identity and a new buyer identity can be presented. The user interface also can include fields and control for optionally specifying additional purchase order selection criteria. In block 1004, user input specifying the old buyer identity, the new buyer identity, and optionally additional purchase order selection criteria can be received. In block 1006, user interface that includes a list of identities of purchase orders that (a) specify the old buyer in the buyer attribute field and also (b) satisfy any of the optionally specified additional selection criteria can be presented. By default, all of the purchase order identities can be selected. In block 1008, user input deselecting one or more of the purchase order identities can be received. In block 1010, user input activating a "process change" button in the user interface can be detected. The remaining operations of the following blocks in FIG. 10 can then be performed automatically in response to the detection of this activation without any further human intervention.

In block 1012, for each selected purchase order, the value of the buyer attribute can be changed to the new buyer identity user-specified in block 1004. In block 1014, for each selected purchase order that requires tracking, a change order can be created and prepared for transmission to a vendor or supplier identified in the corresponding purchase order. In block 1016, for each selected purchase order that requires tracking, a record indicating that the buyer attribute value was changed from the old value to the new value can be logged to an audit history. Optionally, in block 1018, each change order prepared in block 1014 can be automatically transmitted to the corresponding purchase order's identified vendor or supplier using a channel appropriate to the contact information contained within the purchase order.

Hardware Overview

Figure 11:
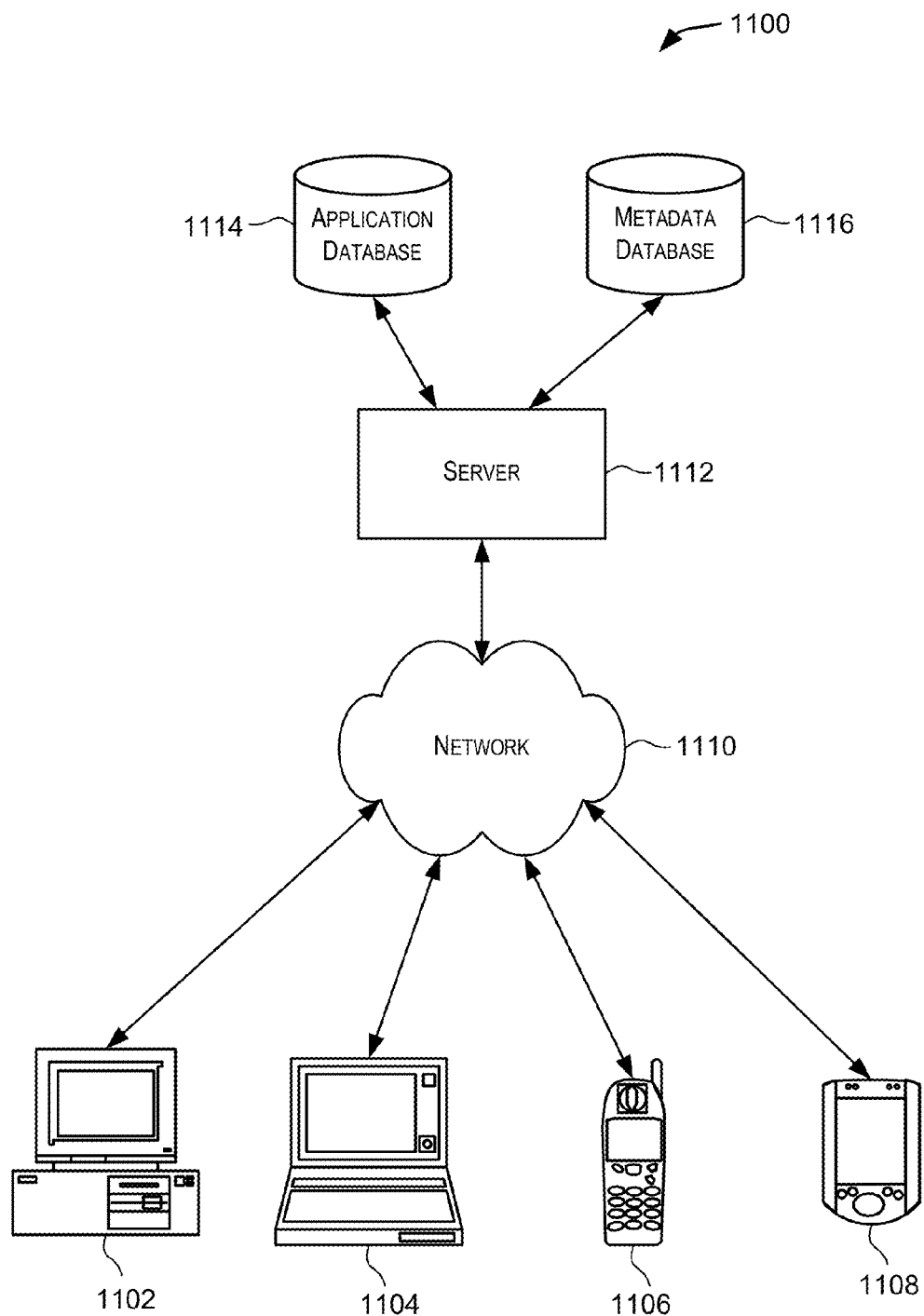
FIG. 11 is a simplified block diagram illustrating components of a system environment that may be used in accordance with an embodiment of the present invention.

FIG. 11 is a simplified block diagram illustrating components of a system environment 100 that may be used in accordance with an embodiment of the present invention. As shown, system environment 1100 includes one or more client computing devices 1102, 1104, 1106, 1108, which are configured to operate client applications including native client applications and possibly other applications such as a web browser, or the like. In various embodiments, client computing devices 1102, 1104, 1106, and 1108 may interact with a server 1112.

Client computing devices 1102, 1104, 1106, 1108 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1102, 1104, 1106, and 1108 may be any other electronic device, such as a thin-client computer, Internet-enabled gaming system, and/or personal messaging device, capable of communicating over a network (e.g., network 1110 described below). Although exemplary system environment 1100 is shown with four client computing devices, any number of client computing devices may be supported. Other devices such as devices with sensors, etc. may interact with server 1112.

System environment 1100 may include a network 1110. Network 1110 may be any type of network familiar to those skilled in the art that can support data communications using any of a variety of commercially-available protocols, including without limitation TCP/IP, SNA, IPX, AppleTalk, and the like. Merely by way of example, network 1110 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1100 also includes one or more server computers 1112 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1112 may be adapted to run one or more services or software applications.

Server 1112 may run an operating system including any of those discussed above, as well as any commercially available server operating system. Server 1112 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

System environment 1100 may also include one or more databases 1114, 1116. Databases 1114, 1116 may reside in a variety of locations. By way of example, one or more of databases 1114, 1116 may reside on a non-transitory storage medium local to (and/or resident in) server 1112. Alternatively, databases 1114, 1116 may be remote from server 1112, and in communication with server 1112 via a network-based or dedicated connection. In one set of embodiments, databases 1114, 1116 may reside in a storage-area network (SAN) familiar to those skilled in the art. Similarly, any necessary files for performing the functions attributed to server 1112 may be stored locally on server 1112 and/or remotely, as appropriate. In one set of embodiments, databases 1114, 1116 may include relational databases, such as databases that are provided by Oracle and that are adapted to store, update, and retrieve data in response to SQL-formatted commands.

Figure 12:
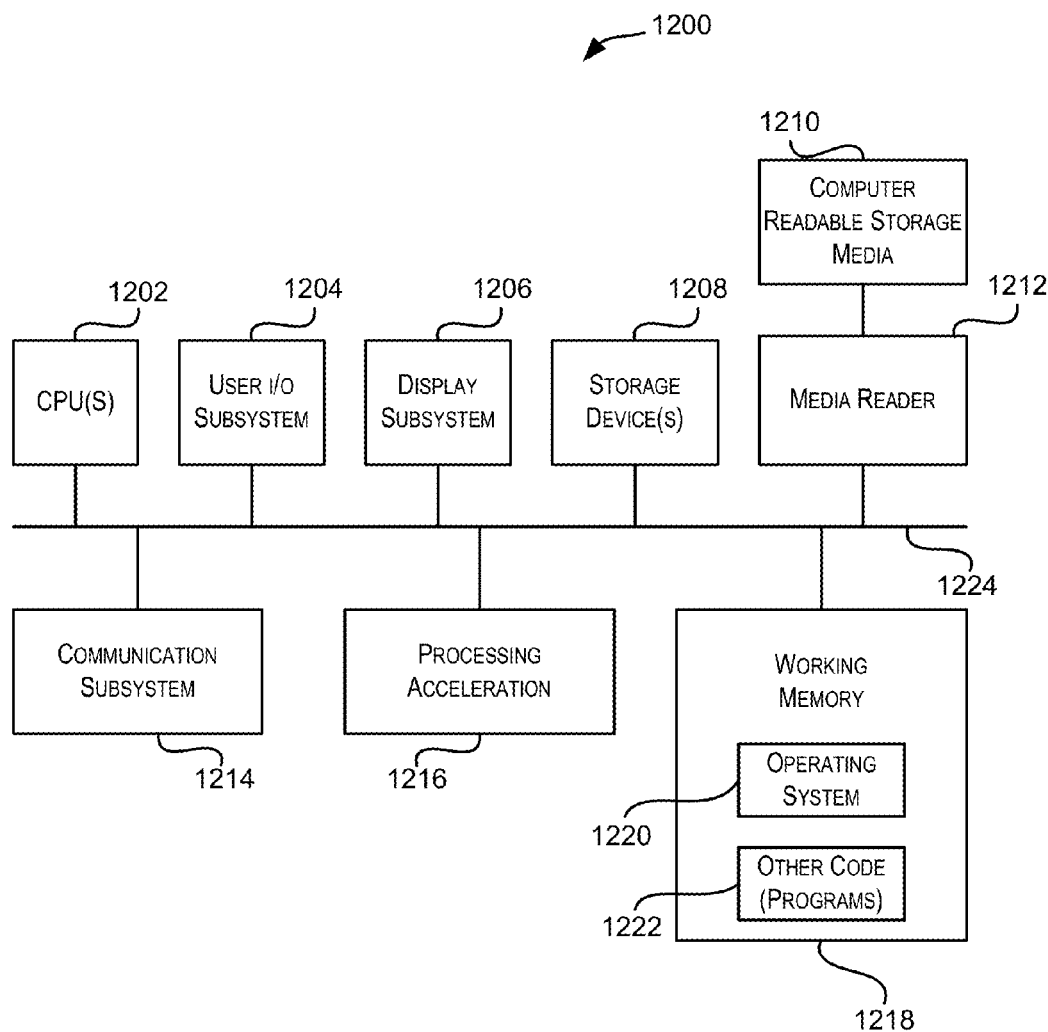
FIG. 12 is a simplified block diagram of a computer system that may be used in accordance with embodiments of the present invention.

FIG. 12 is a simplified block diagram of a computer system 1200 that may be used in accordance with embodiments of the present invention. For example server 1112 or clients 1102, 1104, 1106, or 1108 may be implemented using a system such as system 1200. Computer system 1200 is shown comprising hardware elements that may be electrically coupled via a bus 1224. The hardware elements may include one or more central processing units (CPUs) 1202, one or more input devices 1204 (e.g., a mouse, a keyboard, etc.), and one or more output devices 1206 (e.g., a display device, a printer, etc.). Computer system 1200 may also include one or more storage devices 1208. By way of example, the storage device(s) 1208 may include devices such as disk drives, optical storage devices, and solid-state storage devices such as a random access memory (RAM) and/or a read-only memory (ROM), which can be programmable, flash-updateable and/or the like.

Computer system 1200 may additionally include a computer-readable storage media reader 1212, a communications subsystem 1214 (e.g., a modem, a network card (wireless or wired), an infra-red communication device, etc.), and working memory 1218, which may include RAM and ROM devices as described above. In some embodiments, computer system 1200 may also include a processing acceleration unit 1216, which can include a digital signal processor (DSP), a special-purpose processor, and/or the like.

Computer-readable storage media reader 1212 can further be connected to a computer-readable storage medium 1210, together (and, optionally, in combination with storage device(s) 1208) comprehensively representing remote, local, fixed, and/or removable storage devices plus storage media for temporarily and/or more permanently containing computer-readable information. Communications system 1214 may permit data to be exchanged with network 1110 and/or any other computer described above with respect to system environment 1100.

Computer system 1200 may also comprise software elements, shown as being currently located within working memory 1218, including an operating system 1220 and/or other code 1222, such as an application program (which may be a client application, Web browser, mid-tier application, RDBMS, etc.). In an exemplary embodiment, working memory 1218 may include executable code and associated data structures used for updating purchase orders and communicating changes to sellers as described above. It should be appreciated that alternative embodiments of computer system 1200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A computer-implemented method comprising:
   presenting, by a computing device, a user interface comprising user interface components configured to receive inputs specifying an old value and a new value for a specified order record field, and a user interface element configured to initiate a mass purchase order change via the user interface;
   retrieving, by the computing device, a plurality of order records from a data store, based on a record selection criteria;
   receiving, via the user interface, both an old value and a new value for the specified order record field;
   receiving, via the user interface, a single activation of the user interface element, the single activation corresponding to a request to perform a mass purchase order change for the retrieved plurality of order records;
   in response to receiving the single activation of the user interface element, performing, by the computing device, a set of operations for each of the retrieved plurality of order records, the set of operations comprising:
   (a) determining a subset of the retrieved plurality of order records in an initial state rather than a subsequent state in a sequence of states; and
   (b) for each particular order record of the retrieved plurality of order records, except for the determined subset of the retrieved plurality of order records,
      (i) generating, by the computing device, a change order that indicates that the old value was changed to the new value for the specified order record field in the particular order record,
      (ii) determining a supplier associated with the particular order record;
      (iii) determining a communication channel appropriate for the supplier associated with the particular order record; and
      (iv) transmitting the generated change order to the supplier associated with the particular order record via the determined communication channel.

2. The computer-implemented method of claim 1, wherein the plurality of order records is a plurality of purchase orders; and further comprising:
   for each of the plurality of order records, changing the value of a specified buyer field of the particular order record from the old value to the new value, wherein the old value corresponds to an old buyer identity to a new value corresponds to a new buyer identity.

3. The computer-implemented method of claim 1, wherein the set of operations performed in response to receiving the single activation of the user interface element further comprises:
   for each particular order record of the retrieved plurality of order records, providing, to a specified party, a request to approve a change from the old value to the new value in the particular order record.

4. The computer-implemented method of claim 1, further comprising:
   receiving, through the user interface, the record selection criteria;

wherein the retrieved plurality of order records excludes all records that do not satisfy the record selection criteria.

5. The computer-implemented method of claim 4, wherein the record selection criteria comprise at least one of:
   a business unit that is specified in the particular order record;
   a vendor identifier that is specified in the particular order record;
   a maximum date that a creation date of the particular order record is permitted to have;
   a status indicating that a purchase order represented by the particular order record has been approved;
   a status indicating that approval is pending for a purchase order represented by the particular order record;
   a status indicating that a purchase order represented by the particular order record has been dispatched to a vendor;
   a status indicating that the particular order record is in an open state rather than a closed state; or
   a status indicating that the particular order record is in an initial state rather than a state following the initial state in a sequence of states.

6. The computer-implemented method of claim 4, further comprising:
   presenting, through the user interface, a set of record identifiers of all order records within a database that satisfy the record selection criteria; and
   receiving, through the user interface, user input that selects two or more particular record identifiers from the set of record identifiers;
   wherein the plurality of order records excludes all records having record identifiers that are not among the two or more particular record identifiers.

7. A system comprising:
   one or more processors; and
   a memory communicatively coupled with and readable by the one or more processors and having stored therein processor-readable instructions which, when executed by the one or more processors, cause the one or more processors to:
   present a user interface comprising user interface components configured to receive inputs specifying an old value and a new value for a specified order record field, and a user interface element configured to initiate a mass purchase order change via the user interface;
   retrieve a plurality of order records from a data store, based on a record selection criteria;
   receive, via the user interface, both an old value and a new value for the specified order record field;
   receive, via the user interface, a single activation of the user interface element, the single activation corresponding to a request to perform a mass purchase order change for the retrieved plurality of order records;
   in response to receiving the single activation of the user interface element, performing a set of operations for each of the retrieved plurality of order records, the set of operations comprising:
      (a) determining a subset of the retrieved plurality of order records in an initial state rather than a subsequent state in a sequence of states; and
      (b) for each particular order record of the retrieved plurality of order records, except for the determined subset of the retrieved plurality of order records,
         (i) generating, by the computing device, a change order that indicates that the old value was changed to the new value for the specified order record field in the particular order record,
         (ii) determining a supplier associated with the particular order record;
         (iii) determining a communication channel appropriate for the supplier associated with the particular order record; and
         (iv) transmitting the generated change order to the supplier associated with the particular order record via the determined communication channel.

8. The system of claim 7, wherein the plurality of order records is a plurality of order records is a plurality of purchase orders; and wherein the processor-readable instructions, when executed by the one or more processors, further cause the one or more processors to:
   for each of the plurality of order records, change the value of a specified buyer field of the particular order record from the old value to the new value, wherein the old value corresponds to an old buyer identity and the new value corresponds to a new buyer identity.

9. The system of claim 7, wherein the set of operations performed in response to receiving the single activation of the user interface element further comprises:
   for each particular order record of the retrieved plurality of order records, providing, to a specified party, a request to approve a change from the old value to the new value in the particular order record.

10. The system of claim 7, wherein the processor-readable instructions, when executed by the one or more processors, further cause the one or more processors to:
   receive, through the user interface, the record selection criteria;
   wherein the retrieved plurality of order records excludes all records that do not satisfy the record selection criteria.

11. The system of claim 10, wherein the record selection criteria comprise at least one of:
   a business unit that is specified in the particular order record;
   a vendor identifier that is specified in the particular order record;
   a maximum date that a creation date of the particular order record is permitted to have;
   a status indicating that a purchase order represented by the particular order record has been approved;
   a status indicating that approval is pending for a purchase order represented by the particular order record;
   a status indicating that a purchase order represented by the particular order record has been dispatched to a vendor;
   a status indicating that the particular order record is in an open state rather than a closed state; or
   a status indicating that the particular order record is in an initial state rather than a state following the initial state in a sequence of states.

12. The system of claim 10, wherein the processor-readable instructions, when executed by the one or more processors, further cause the one or more processors to:
   present, through the user interface, a set of record identifiers of all order records within a database that satisfy the record selection criteria; and
   receive, through the user interface, user input that selects two or more particular record identifiers from the set of record identifiers;
   wherein the plurality of order records excludes all records having record identifiers that are not among the two or more particular record identifiers.

13. The computer-implemented method of claim 1, further comprising:

determining a current order status for each of the retrieved order records;

identifying, based on the order statuses for the retrieved order records, a second subset of the order records that do not correspond to closed or completed orders; and determining the plurality of records on which to perform the set of operations, as the second subset of order records that do not correspond to closed or completed orders.

14. The computer-implemented method of claim 1, wherein the set of operations further comprises:

determining a second subset of the plurality of order records requiring change approvals;

transmitting, to a specified party, a request to approve a change from the old value to the new value for each of the second subset of records.

15. A non-transitory computer-readable storage memory storing a plurality of instructions which, when executed by one or more processors, cause the one or more processors to perform actions comprising:

presenting a user interface comprising user interface components configured to receive inputs specifying an old value and a new value for a specified order record field, and a user interface element configured to initiate a mass purchase order change via the user interface;

retrieving a plurality of order records from a data store, based on a record selection criteria;

receiving, via the user interface, both an old value and a new value for the specified order record field;

receiving, via the user interface, a single activation of the user interface element, the single activation corresponding to a request to perform a mass purchase order change for the retrieved plurality of order records;

in response to receiving the single activation of the user interface element, performing a set of operations for each of the retrieved plurality of order records, the set of operations comprising:

(a) determining a subset of the retrieved plurality of order records in an initial state rather than a subsequent state in a sequence of states; and (b) for each particular order record of the retrieved plurality of order records, except for the determined subset of the retrieved plurality of order records, (i) generating a change order that indicates that the old value was changed to the new value for the specified order record field in the particular order record, (ii) determining a supplier associated with the particular order record;

(iii) determining a communication channel appropriate for the supplier associated with the particular order record; and (iv) transmitting the generated change order to the supplier associated with the particular order record via the determined communication channel.

16. The non-transitory computer-readable storage memory of claim 15, wherein the plurality of order records is a plurality of purchase orders; and wherein the plurality of instructions further cause the one or more processors to perform actions comprising:

for each of the plurality of order records, changing the value of a specified buyer field of the particular order record from the old value to the new value, wherein the old value corresponds to an old buyer identity and the new value corresponds to a new buyer identity.

17. The non-transitory computer-readable storage memory of claim 15, wherein the set of operations performed in response to receiving the single activation of the user interface element further comprises:

for each particular order record of the retrieved plurality of order records, providing, to a specified party, a request to approve a change from the old value to the new value in the particular order record.

18. The non-transitory computer-readable storage memory of claim 15, the plurality of instructions further causing the one or more processors to perform actions comprising:

receiving, through the user interface, the record selection criteria;

wherein the retrieved plurality of order records excludes all records that do not satisfy the record selection criteria.

19. The non-transitory computer-readable storage memory of claim 18, wherein the record selection criteria comprise at least one of:

a business unit that is specified in the particular order record;

a vendor identifier that is specified in the particular order record;

a maximum date that a creation date of the particular order record is permitted to have;

a status indicating that a purchase order represented by the particular order record has been approved;

a status indicating that approval is pending for a purchase order represented by the particular order record;

a status indicating that a purchase order represented by the particular order record has been dispatched to a vendor;

a status indicating that the particular order record is in an open state rather than a closed state; or a status indicating that the particular order record is in an initial state rather than a state following the initial state in a sequence of states.

20. The non-transitory computer-readable storage memory of claim 18, the plurality of instructions further causing the one or more processors to perform actions comprising:

presenting, through the user interface, a set of record identifiers of all order records within a database that satisfy the record selection criteria; and receiving, through the user interface, user input that selects two or more particular record identifiers from the set of record identifiers;

wherein the plurality of order records excludes all records having record identifiers that are not among the two or more particular record identifiers.

* * * * *